United States Patent
Kim

(10) Patent No.: US 8,379,344 B2
(45) Date of Patent: Feb. 19, 2013

(54) AIRFLOW DISPERSION SYSTEM

(75) Inventor: Youn Tai Kim, Hwaseong-si (KR)

(73) Assignee: Seagate Technology International

( * ) Notice: Subject to any disclaimer, the term of this patent is extended or adjusted under 35 U.S.C. 154(b) by 423 days.

(21) Appl. No.: 12/464,976

(22) Filed: May 13, 2009

(65) Prior Publication Data

US 2009/0284865 A1   Nov. 19, 2009

(30) Foreign Application Priority Data

May 13, 2008  (KR) ................. 2008-043862

(51) Int. Cl.
*G11B 33/08* (2006.01)
(52) U.S. Cl. .................................................. 360/97.02
(58) Field of Classification Search ............... 360/97.02
See application file for complete search history.

(56) References Cited

U.S. PATENT DOCUMENTS

| | | | | |
|---|---|---|---|---|
| 6,031,690 A * | 2/2000 | Kelemen et al. | ............ | 360/256.1 |
| 2003/0002206 A1* | 1/2003 | Long et al. | ................ | 360/97.02 |
| 2003/0223153 A1* | 12/2003 | Wobbe et al. | .............. | 360/245.3 |
| 2004/0212920 A1* | 10/2004 | Tadepalli et al. | .......... | 360/97.02 |
| 2008/0037162 A1* | 2/2008 | Hirano et al. | ............. | 360/97.02 |
| 2008/0100957 A1* | 5/2008 | Gross et al. | ................ | 360/97.02 |

FOREIGN PATENT DOCUMENTS

| | | |
|---|---|---|
| JP | 08-102159 | 4/1996 |
| KR | 2002-96991 | 12/2002 |
| KR | 2005-43268 | 5/2005 |

* cited by examiner

*Primary Examiner* — Hoai V Ho
*Assistant Examiner* — Pablo Huerta

(57) ABSTRACT

A hard disk drive includes a base, a disk to record and store data, a head stack assembly provided in the base to read out data from the disk which rotates about a pivot shaft, and an air force dispersion unit positioned adjacent to the head stack assembly to disperse an air force generated during a rotation of the disk.

21 Claims, 15 Drawing Sheets

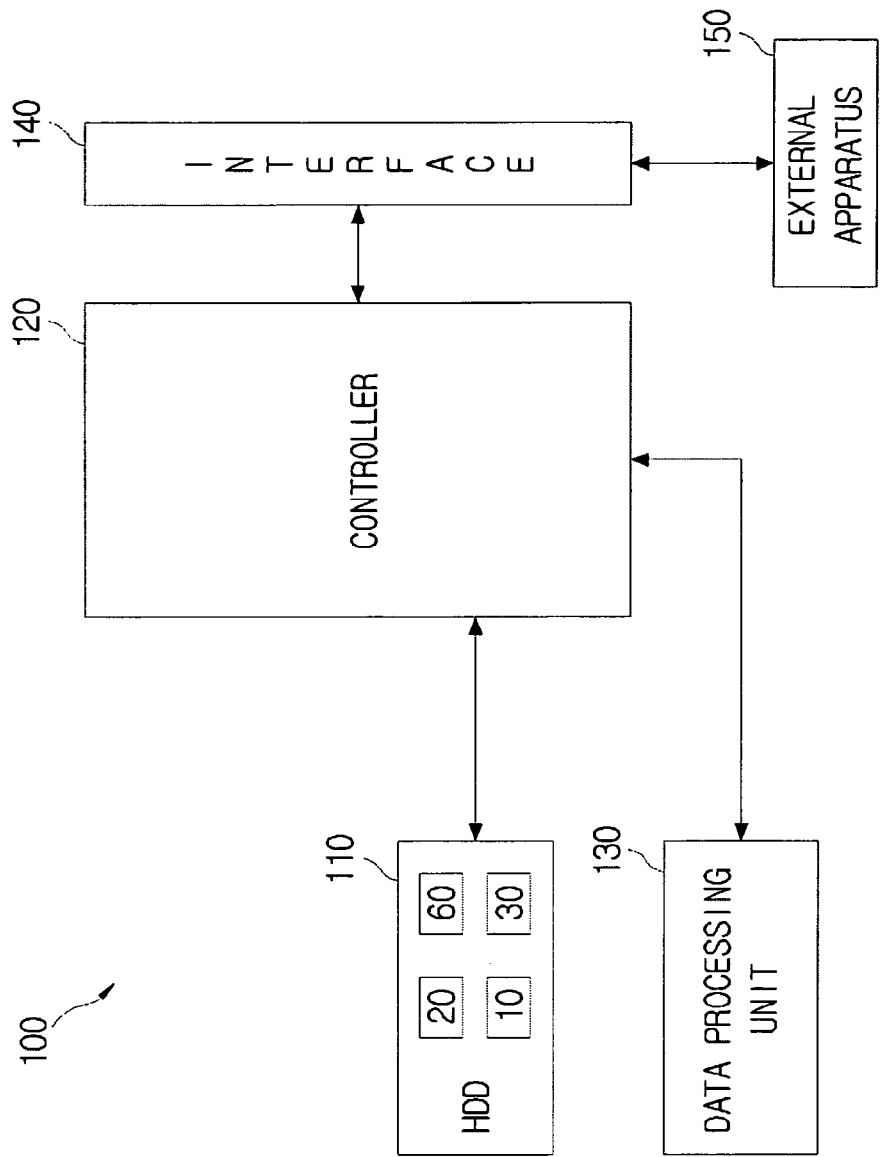

AIRFLOW DISPERSION SYSTEM

CROSS-REFERENCE TO RELATED APPLICATIONS

This application claims priority under 35 U.S.C. §119(a) from Korean Patent Application No. 10-2008-0043862, filed on May 13, 2008, in the Korean Intellectual Property Office, the disclosure of which is incorporated herein in its entirety by reference.

BACKGROUND

1. Field of the Invention

The general inventive concept relates to a hard disk drive (HDD), and more particularly, to an HDD which can prevent or substantially reduce track non-uniformity generated when an interval between tracks is not maintained constant during copying of a servo pattern or recording of data due to an air force which concentrates on a head stack assembly (HSA), and further improve an overall quality and yield of the HDD.

2. Description of the Related Art

HDDs are data storage devices capable of recording data on a disk or reproducing data stored on the disk by using a read/write head. The HDDs are widely used as auxiliary memory devices of computer systems because of their relatively fast access time to a large amount of data for recording or reproduction.

As the HDD having a high tracks per inch (TPI) and a high bits per inch (BPI) can be embodied, an increase in a data storage capacity and a decrease in a size have been rapidly realized. Also, the application of the HDD has been expanded to laptops, MP3 players, mobile communication terminals, etc. Accordingly, there has been a request for development of a compact HDD which can be used for portable electronic products such as notebooks, personal digital assistants (PDAs), and mobile phones. Actually, an HDD having a diameter of 2.5 inches has been already developed and applied for notebooks. Also, a smaller HDD having a diameter of 0.8 inches, which has a size similar to a coin, has been recently developed and is already used or expected to be used for mobile phones or MP3 players.

Recently, as the high TPI is realized, track non-uniformity, which is caused when desired information is not properly recorded because an interval between tracks is not maintained constant during recording of the information on a track, is often generated. There may be various reasons for the track non-uniformity, for example, low stiffness of a spindle motor. In particular, there has been a study showing that the track non-uniformity is generated because an air force or an external interference, which is generated during a rotation of a disk, is concentrated on a head stack assembly (HSA) that reads or writes data by using a magnetic head mounted on an end portion of the HSA.

In a conventional HDD, for example, a shroud is installed on a base at an outside portion of a disk to reduce vibrations of the disk. The shroud often protrudes a predetermined height in an arc shape by contacting a side surface of the base. However, in the conventional HDD, due to the shroud being separately installed to reduce the vibration of a disk, the air force is concentrated on a spot, for example, the HSA. Accordingly, the track non-uniformity is generated which causes data to be inappropriately recorded on a track.

In particular, the air force that concentrates on the HSA acts as an obstacle not only to reading and recording of data as the TPI increases, but also to copying of a servo pattern in a process. Thus, an overall quality and yield of the HDD is deteriorated by the concentrated air force. Furthermore, there has been suggested an HDD without having a shroud. However, even when the shroud is removed, the vibration of a disk still remains unsolved.

SUMMARY

The general inventive concept provides a hard disk drive (HDD) which can prevent track non-uniformity generated when the interval between tracks is not maintained constant during copying of a servo pattern or recording of data due to an air force concentrated on a head stack assembly (HSA), and further improve an overall quality and yield of the HDD Additional features and/or utilities of the present general inventive concept will be set forth in part in the description which follows and, in part, will be obvious from the description, or may be learned by practice of the general inventive concept.

Exemplary embodiments of the present general inventive concept provide a hard disk drive including a base, a disk provided in the base to record and store data, a head stack assembly to read data from the disk while rotating about a pivot shaft, and an air force dispersion unit disposed adjacent to the head stack assembly to disperse an air force generated during the rotation of the disk.

The air force dispersion unit may stand erect with respect to a lower surface of the base in an area between the disk and the head stack assembly.

The head stack assembly may include an actuator having an end portion on which a magnetic head reads or writes data with respect to the disk and a voice coil motor disposed at an opposite position of the actuator with respect to the pivot shaft to drive the actuator, wherein the air force dispersion unit may be arranged in a direction crossing a circumferential direction of the disk, by which a first part of the air force may flow toward the actuator and a second part of the air force may flow to a rear of the voice coil motor.

A first portion of the air force dispersion unit may be provided at or adjacent to an outer circumferential surface of the disk while a second end portion of the air force dispersion unit may be coupled to the voice coil motor.

The air force dispersion unit may be integrally formed on the base.

The hard disk drive may further include a cover to cover an upper surface of the base, wherein the air force dispersion unit may be provided at the cover.

The hard disk drive may further include an air dam provided at a position opposite to the air force dispersion unit to block an air flow from the head stack assembly toward the disk.

The air dam may stand erect with respect to a lower surface of the base outside the disk.

The air dam may have an arc shape.

The air dam may be integrally formed on the base.

The air dam may be provided at a cover which covers an upper surface of the base.

Exemplary embodiments of the present general inventive concept also provide a hard disk drive including a base, a disk provided in the base to record and store data, a head stack assembly provided in the base to read out data from the disk while rotating about a pivot shaft, and an air dam provided outside of the disk to block an air flow from the head stack assembly toward the disk.

The air dam may have an arc shape and be integrally formed on the base to stand erect with respect to a lower surface of the base outside the disk.

Exemplary embodiments of the present general inventive concept also provide a hard disk drive having a base which includes a data storage unit disposed within the base, a head unit to read data from and/or write data to the data storage unit, and an air flow disrupter configured to disrupt an airflow generated within the base.

Exemplary embodiments of the present general inventive concept also provide a hard disk drive having a base which includes a data storage unit disposed within the base, a head unit to read data from and/or write data to the data storage unit, and an air dispersion unit configured to disrupt an airflow generated by the data storage unit to reduce an airflow toward the head unit.

The air dispersion unit may be disposed between the data storage unit and the head unit.

At least one of the base and head unit may be integrally formed with the air dispersion unit.

Exemplary embodiments of the present general inventive concept also provide an electronic apparatus which includes a hard disk having a base to support at least one data storage disk, a head unit used to read/write data from the at least one data storage disk and an air dispersion unit positioned within the base to disrupt an airflow of the data storage disk, and a controller.

The air dispersion unit may be disposed between the data storage unit and the head unit.

At least one of the base and the head unit may be integrally formed with the air dispersion unit.

Exemplary embodiments of the present general inventive concept also provide a method of manufacturing an electronic apparatus having a housing, the method includes disposing at least one data storage disk on a base, disposing a head unit to read and/or write data from the data storage disk, and forming at least one air dispersion unit within the base to divert a path of an airflow generated by the head unit.

BRIEF DESCRIPTION OF THE DRAWINGS

These and/or other aspects and utilities of the present general inventive concept will become apparent and more readily appreciated from the following description of the exemplary embodiments, taken in conjunction with the accompanying drawings of which:

FIG. 7 is a schematic view of an electronic apparatus having an HDD apparatus according to an exemplary embodiment of the present general inventive concept.

DETAILED DESCRIPTION OF THE EMBODIMENTS

Figure 1:
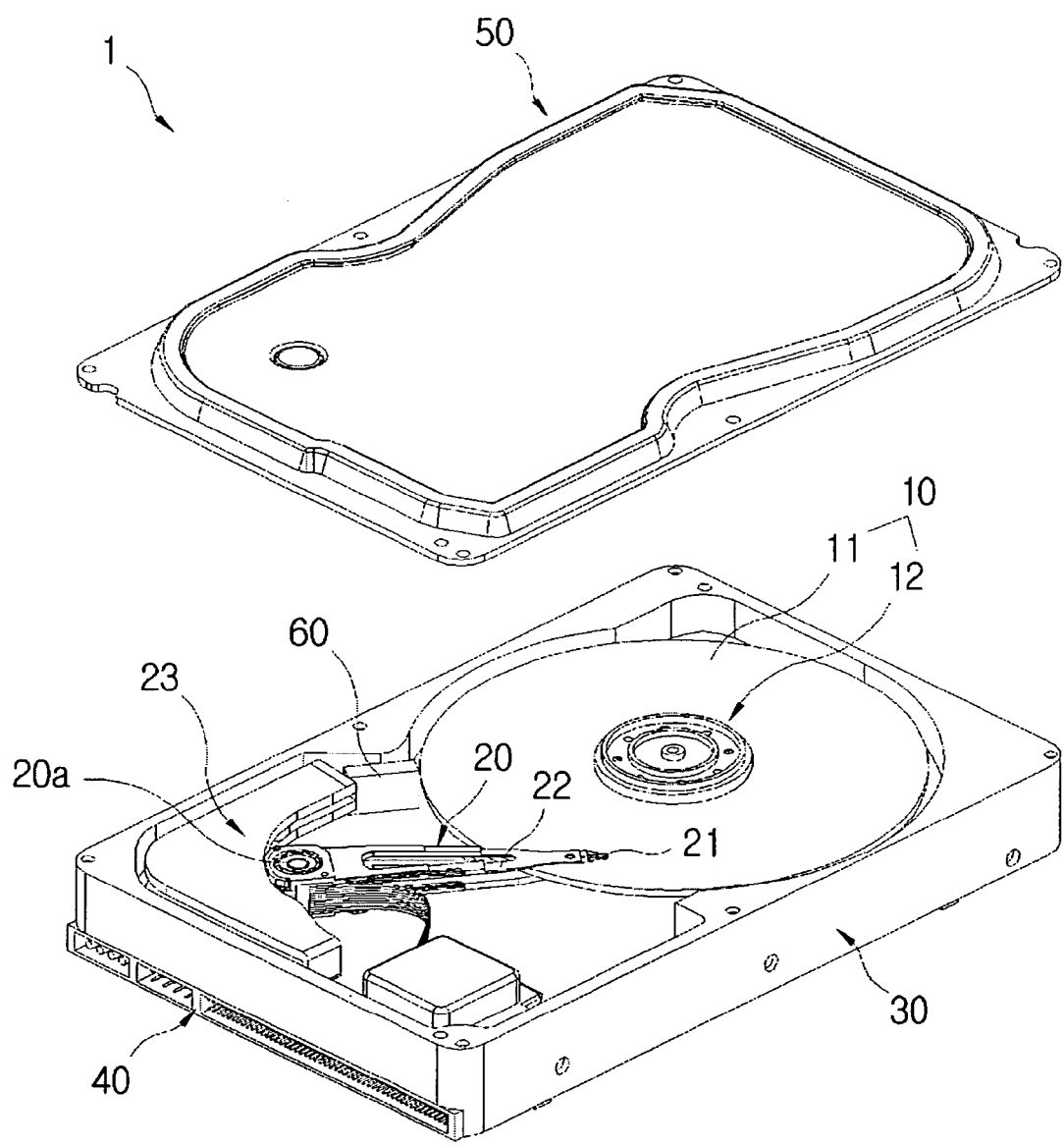
FIG. 1 is a perspective view of an HDD apparatus according to an exemplary embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The attached drawings for illustrating exemplary embodiments of the inventive concept are referred to in order to gain a sufficient understanding of the general inventive concept and the merits thereof. Hereinafter, the general inventive concept will be described in detail by explaining exemplary embodiments of the inventive concept with reference to the attached drawings. Like reference numerals in the drawings denote like elements.

Figure 2:
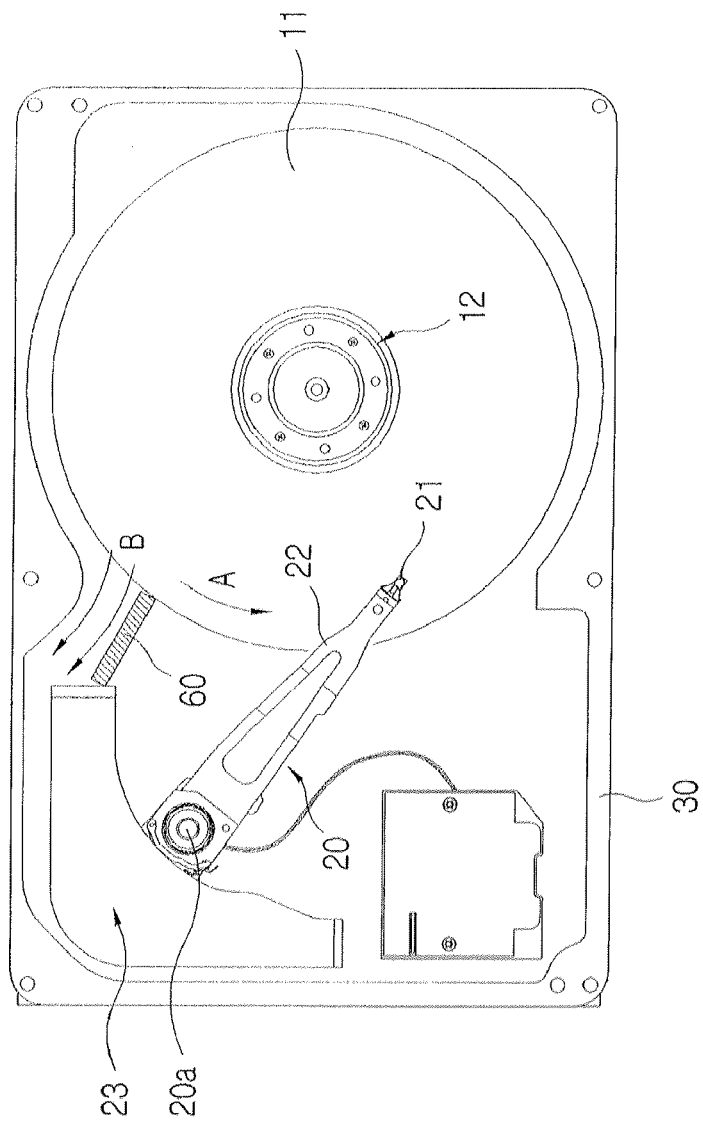
FIG. 2 is a top plan view of the HDD apparatus of FIG. 1 without the cover.

FIG. 1 is a perspective view of a hard disk drive (HDD) 1 according to an exemplary embodiment of the present inventive concept. FIG. 2 is a top plan view of the HDD 1 of FIG. 1 without a cover 50. Referring to FIGS. 1 and 2, the HDD 1 according to the present exemplary embodiment includes a disk 11 used to record and store data, a disk pack 10 having a spindle motor 12 to support and rotate the disk 11, a head stack assembly (HSA) 20 to read data on the disk 11, a base 30 on which a plurality of internal parts, including the above described parts are assembled, a printed circuit board assembly (PCBA) 40 coupled to a lower portion of the base 30 to control various parts, the PCBA 40 having a printed circuit board (PCB) on which most circuit parts are installed, and the cover 50 to cover an upper side of the base 30.

In detail, the disk 11 that records and stores data and which is one of the elements of the disk pack 10 has a recording surface at both upper and lower sides thereof. Thus, a magnetic head 21 of the HSA 20 may be provided as a pair so as to be arranged at both upper and lower surfaces of the disk 11 to read or write data at a particular position. This structure is equally applied to copying of a servo pattern.

As another element of the disk pack 10, the spindle motor 12 includes a spindle motor hub (not illustrated) used to support the disk 11, a clamp (not illustrated) coupled to an upper portion of the spindle motor hub, and a clamp screw (not illustrated) used to fix the disk 11 on the spindle motor hub by pressing on the clamp.

The HSA 20 is a carriage used to record data on the disk 11 or to reproduce the data recorded on the disk 11. The HSA 20 includes the magnetic head 21 to read and write data with respect to the disk 11, an actuator 22 having the magnetic head 21 mounted on an end portion thereof pivots around a pivot shaft 20a across the disk 11 to allow the magnetic head 21 to access data on the disk 11, and a voice coil motor (VCM) 23 provided at an opposite position to the actuator 22 with respect to the pivot shaft 20a to drive the actuator 22.

Accordingly, as the VCM 23 drives the actuator 22 to pivot around the pivot shaft 20a, the magnetic head 21 mounted on the end portion of the actuator 22 moves in a radial direction of the disk 11, which rotates, to search for a track and access a searched track so that accessed information may be signal processed.

The base 30 is a portion where a variety of internal parts including the disk pack 10 and the HSA 20 are assembled. The base 30 is divided into a flat type, in which the upper surface of the base 30 is manufactured to be flat so that the internal parts may be assembled by being mounted thereon, and a bowl type, in which the internal parts are assembled by being accommodated therein.

Although the latter is described in the present exemplary embodiment, the present inventive concept is not limited thereto. That is, in alternative exemplary embodiments, a bowl type base (not illustrated) may also be used.

The PCBA 40 includes a controller (not illustrated) to control various controls of the HDD 1 and a memory (not illustrated) to store various data or tables, as a plurality of circuit parts. The cover 50 is coupled to an upper opening portion of the base 30 and protects the above-described parts disposed within the base 30.

An air force is generated around the disk 11 due to a rotation of the disk 11 during an operation of the HDD 1. The air force may flow in a direction A along a circumferential direction of the disk 11, as illustrated in FIG. 2.

As described above, the air force is a type of external interference. When all or substantially all of the air force is concentrated on the HSA 20, an interval between tracks is not maintained constant during the copying of a servo pattern or the recording of data. Accordingly, track non-uniformity may be generated so that an overall quality of the HDD 1 and yield may be deteriorated.

Thus, when a flying motion of the magnetic head 21 is not considered, the air force can be removed. However, since a rotational structure such as the disk 11 is installed, it is difficult to remove a generation of the air force.

In the present general inventive concept, an air force dispersion unit 60 may be provided to disperse the air force to a rear of the VCM 23 so as not to be concentrated on the HSA 200. The air force dispersion unit 60 stands erect with respect to a lower surface of the base 30 at a position close to the HSA 20, that is, in an area between the disk 11 and the HSA 20. However, the present general inventive concept is not limited thereto. That is, the air force dispersion unit 60 may be disposed in various configurations to disrupt an air flow within the HDD 1.

The air force dispersion unit 60, as illustrated in the drawings, is arranged in a direction which crosses a circumferential direction of the disk 11 in an area between the disk 11 and the HSA 20. Consequently, air flows by being dispersed in directions A and B with respect to the air force dispersion unit 60. (See FIG. 2).

As the air force in the direction A flows toward the magnetic head 21 of the HSA 20 and the air force in the direction B flows to the rear of the VCM 23, unlike the conventional technology, all of the air force is not concentrated on the VCM 23 or on the magnetic head 21 of the HSA 20. Thus, the conventionally generated track non-uniformity may be prevented or substantially reduced by exemplary embodiments of the present general inventive concept.

In the present exemplary embodiment, the air force dispersion unit 60 may include a block shape. However, the general inventive concept is not limited thereto. An end portion of the air force dispersion unit 60 is provided adjacent to or close to the outer circumferential surface of the disk 11 as long as the rotation of the disk 11 is not restricted, while the other end thereof is coupled to the VCM 23.

Figure 3:
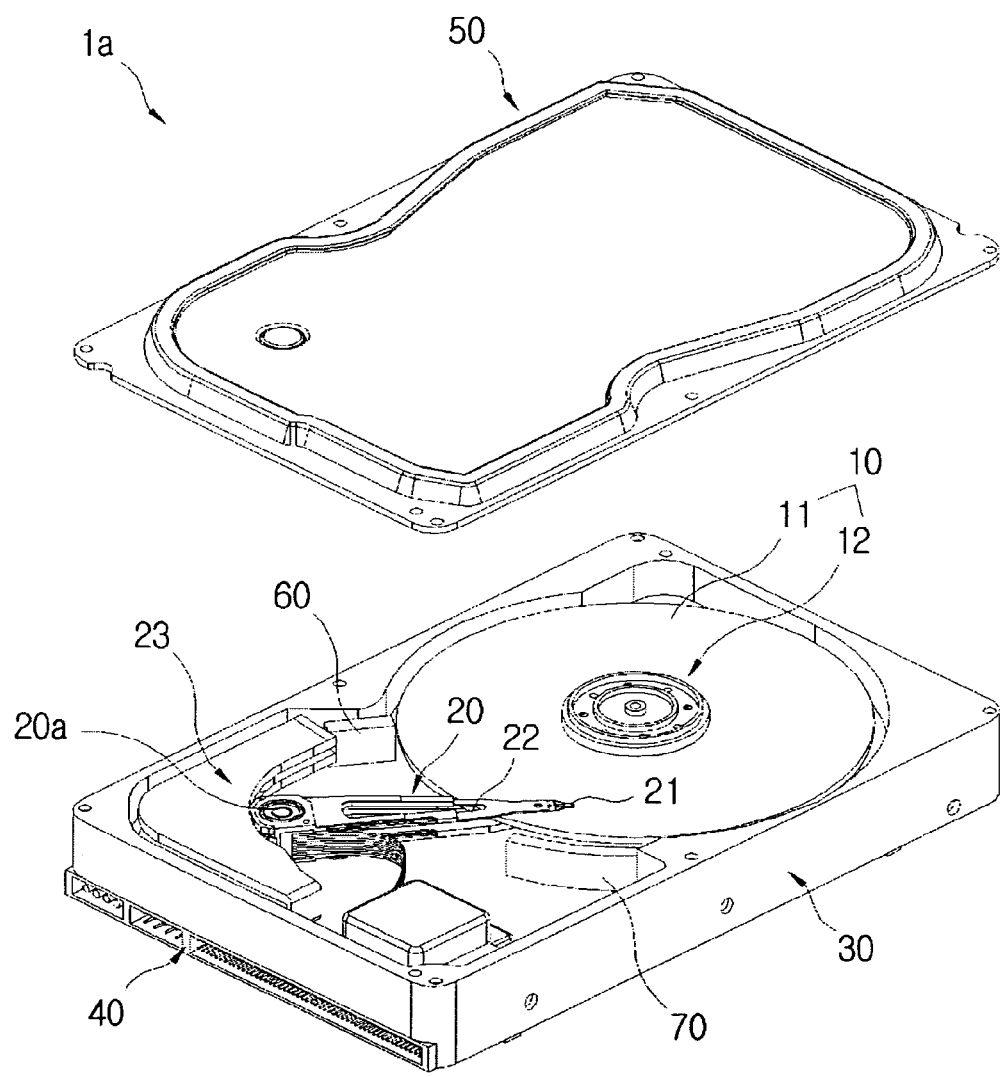
FIG. 3 is a perspective view of an HDD apparatus according to another exemplary embodiment of the present inventive concept.

Referring now to FIG. 3, the air force dispersion unit 60 may extend from a bottom surface of the base 30 toward a top surface of the base 30 to include a height H1. In exemplary embodiments, the top surface of the air force dispersion unit 60 may be planar with a top surface of the base 30. However, the present general inventive concept is not limited thereto. That is, the height H1 of the air force dispersion unit 60 may be equal to or less than a height of a sidewall 31 of the base 30.

In alternative exemplary embodiments, the height H1 of the air force dispersion unit 60 may extend from the bottom surface of the base 30 to a top surface of the disk 11.

However, the present general inventive concept is not limited thereto. That is, since the air force dispersion unit 60 according to the present exemplary embodiment disperses the flow of air as described above, it is sufficient that the air force dispersion unit 60 is located at a position where the flow of air may be at least partially dispersed.

Thus, a shape, size, and structure of the air force dispersion unit 60 may be appropriately determined according to a shape and size of the HDD 1. However, if the air force dispersion unit 60 is integrally formed on the base 30, as in the present exemplary embodiment, a complexity and manufacturing required to separately install the air force dispersion unit 60 may be reduced.

Alternatively, the air force dispersion unit 60 may be provided on an inner surface of the cover 50. When the air force dispersion unit 60 is provided on the cover 50, the air force dispersion unit 60 is separately manufactured and then attached to the cover 50 using an adhesive or a double-sided adhesive tape, since it is difficult to integrally install the air force dispersion unit 60 on the cover 50.

In the operation of the HDD 1 configured as described above, when power is applied to the HDD 1, current is supplied to a voice coil (not illustrated) of the VCM 23 so that the actuator 22 pivots around the pivot shaft 20*a*. Accordingly, the magnetic head 21 flies over a surface of the disk 11, which rotates, to read and/or write data. Similarly, during copying of a servo pattern, for example, the servo pattern is copied while the magnetic head 21 flies over the surface of the disk 11 which is rotating.

In doing so, an air force is generated in the direction A of FIG. 2 due to the rotation of the disk 11. The generated air force is dispersed by the air force dispersion unit 60 such that part of the air force may flow toward the magnetic head 21 of the HSA 20 in the direction A and the other part of the air force may flow toward the rear of the VCM 23 in the direction B. Accordingly, unlike the conventional technology, not all of the air force is concentrated on the HSA 20 so that the generation of track non-uniformity may be prevented or substantially reduced.

Next, when the power to the HDD 1 is cut off and the rotation of the disk 11 is stopped, the magnetic head 21 is either parked in a parking area (not illustrated) or accommodated on a ramp (not illustrated), thus completing parking. Thus, according to the present exemplary embodiment, the track non-uniformity generated since the interval between tracks is not maintained constant due to the air force concentrating on the HSA 20 during the copying of a servo pattern or the recording of data may be prevented or substantially reduced. Furthermore, an overall quality and yield of the HDD 1 may be improved.

In particular, in the present exemplary embodiment, since the track non-uniformity is prevented or reduced from being generated in an HDD having a high TPI, an overall quality and yield of the HDD 1 may be substantially improved.

Figure 4:
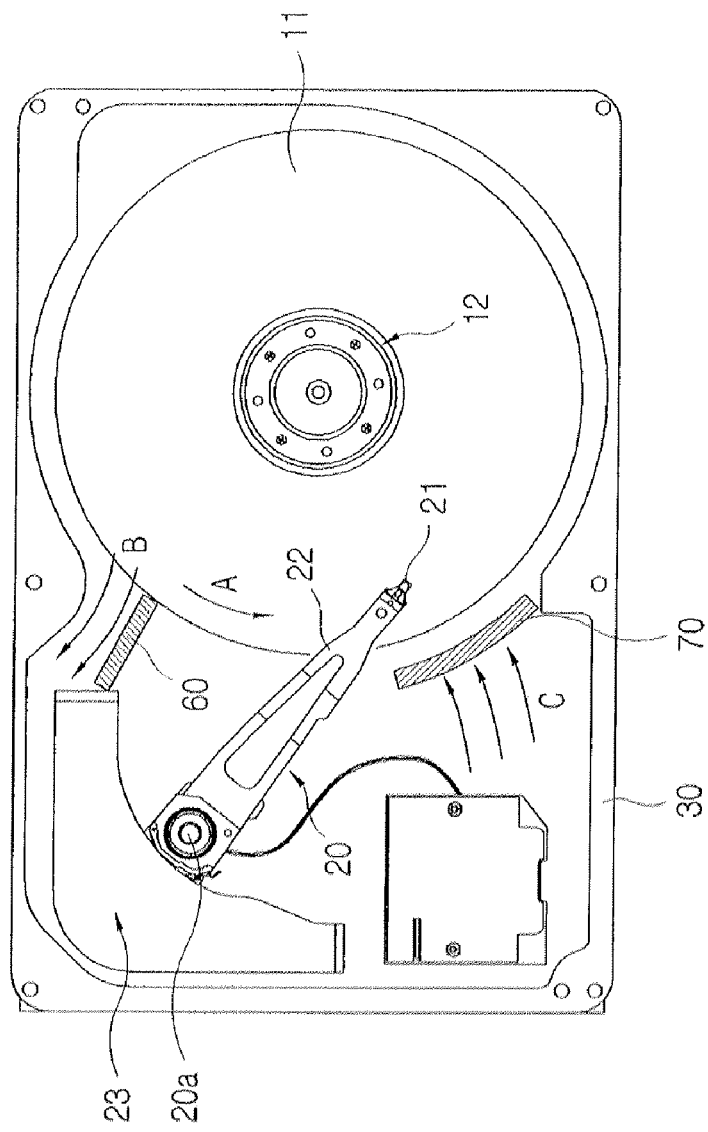
FIG. 4 is a top plan view of the HDD apparatus of FIG. 3 without the cover.

FIG. 3 is a perspective view of an HDD 1*a* according to another exemplary embodiment of the present general inventive concept. FIG. 4 is a top plan view of the HDD 1*a* of FIG. 3 excluding the cover.

In the above-described exemplary embodiment, the generation of track non-uniformity is prevented or reduced by dispersing the air force that is concentrated on the HSA 20 by providing the air force dispersion unit 60 at one side of the base 30. However, in the present exemplary embodiment, an air dam 70 may further be provided in addition to the air force dispersion unit 60.

The air dam 70 may be provided at a position facing the air force dispersion unit 60, as illustrated in FIGS. 3 and 4. However, the present general inventive concept is not limited thereto. That is, the air dam 70 may be provided at various positions which assist in preventing or reducing a concentration of an air force on the HSA 20. The air dam 70 may block the flow of air from the HSA 20 toward the disk 11. That is, as illustrated in FIG. 4, the track non-uniformity may be prevented or substantially reduced by preventing the air flow dispersed in the directions A and B from flowing from the HSA 20 toward the disk 11 in a direction C. However, the present general inventive concept is not limited thereto. That is, the air dam 70 may be disposed in various configurations to disrupt an air flow within the HDD 1.

In other words, the air force generated in the HDD 1a may continuously circulate unless the air force is lost. When the air force at the HSA 20 is moved to the disk 11 and then concentrated on the HSA 20 during the rotation of the disk 11, the track non-uniformity is highly likely to be generated. Accordingly, by installing the air dam 70 as illustrated in the drawings, the generation of the track non-uniformity may be prevented or substantially reduced.

In exemplary embodiments, the air dam 70 may extend from a bottom surface of the base 30 toward a top surface of the base 30 to include a height H2. (See FIG. 3). In exemplary embodiments, the top surface of the air dam 70 may be planar with a top surface of the base 30. However, the present general inventive concept is not limited thereto. That is, the height H2 of the air dam 70 may be equal to or less than a height of a sidewall 31 of the base 30. In alternative exemplary embodiments, the height H2 of the air dam 70 may extend from the bottom of the base 30 to a position disposed below the magnetic head 21. In an exemplary embodiment, the height H2 of the air dam 70 may extend from the bottom of the base 30 to a position disposed below the HSA 20.

In the present exemplary embodiment, the air dam 70 is integrally provided on the base 30 to stand erect with respect to the lower surface of the base 30 similar to the air force dispersion unit 60. While the air force dispersion unit 60 has a linear block shape, the air dam 70 has an arc block shape corresponding to a circumferential surface of the disk 11. However, present general inventive concept is not limited to the shape, structure, and position of the air dam 70. Thus, the air dam 70 may have a linear block shape or be provided at or adjacent to the cover 50.

Figure 4A:
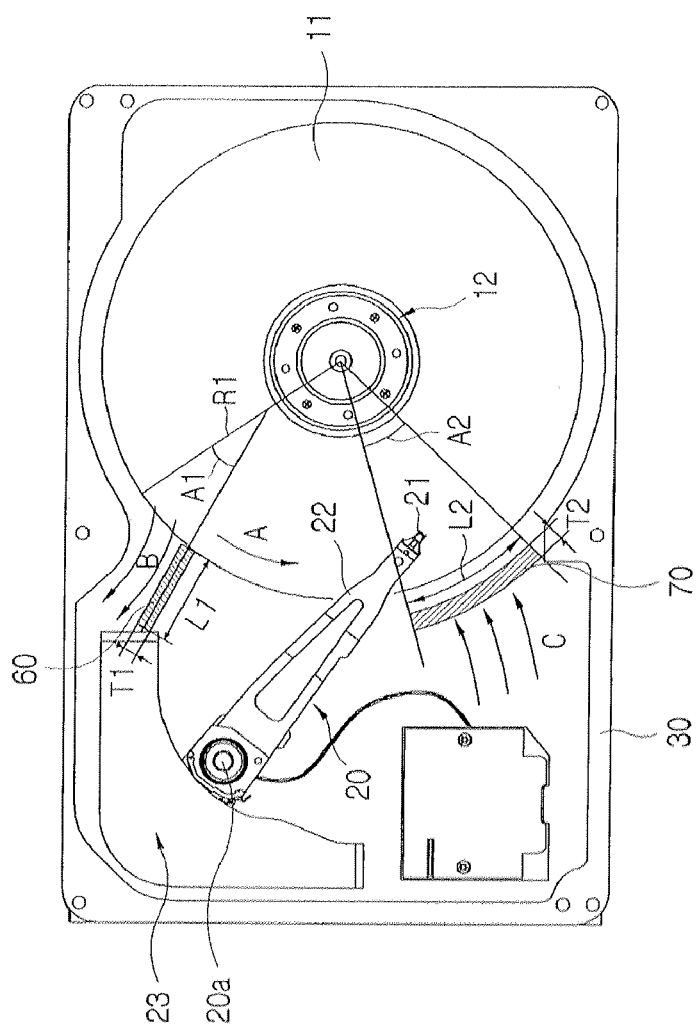
FIG. 4A is a top plan view illustrating positional relationships of an air dispersion unit and an air dam within the HDD of FIG. 3.

FIG. 4A is a top plan view illustrating positional relationships of an air dispersion unit and an air dam with respect to the HDD of FIG. 3.

Referring to FIG. 4A, the air dispersion unit 60 may extend to include a length L1 and a thickness T1 and may be disposed within the base 30 at an angle A1 with respect to a radial direction R1 of the disk 11. That is, as illustrated in FIG. 4A, the length L1 of the air dispersion unit 60 may extend along a path which is disposed at the angle A1 from the radial direction R1 of the disk 11. However, the present general inventive concept is not limited thereto. That is, in exemplary embodiments, the length L1 of the air dispersion unit may extend along a path which is aligned with the radial direction R1 of the disk 11. In exemplary embodiments, the length L1 and the thickness T1 of the air dispersion unit 60 may correspond to an available space within the base 30.

In exemplary embodiments, the air dispersion unit 60 may disrupt an air flow generated by a rotation of the disk 11 such that a first portion of the air flow is directed along direction A and a second portion of the air flow is directed along direction B. In an exemplary embodiment, an amount of air flow directed along direction B may be greater than or equal to an amount of air flow directed along direction A.

In exemplary embodiments, as illustrated in FIG. 4A, the air dam 70 may extend to include a length L2 and a thickness T2 and may be disposed within the base 30 to cover an area of the magnetic head 21. That is, the length L2 of the air dam 70 may extend along a curve which corresponds with a radius or curve of the disk 11. However, the present general inventive concept is not limited thereto. That is, the length L2 of the air dam 70 may be disposed within an area defined by an angle A2. As illustrated in FIG. 4A, the angle A2 formed between radial directions of the disk 11 may define an area in which the air dam 70 may be disposed. In particular, in an exemplary embodiment, the air dam 70 may be positioned to correspond to an area in which the magnetic head 21 travels. However, the present general inventive concept is not limited thereto. That is, the air dam 70 may correspond to a circumferential direction of the disk 11. In alternative exemplary embodiments, the air dam 70 may be substantially straight and be positioned to be parallel to a radial direction of the disk 11.

Figure 5:
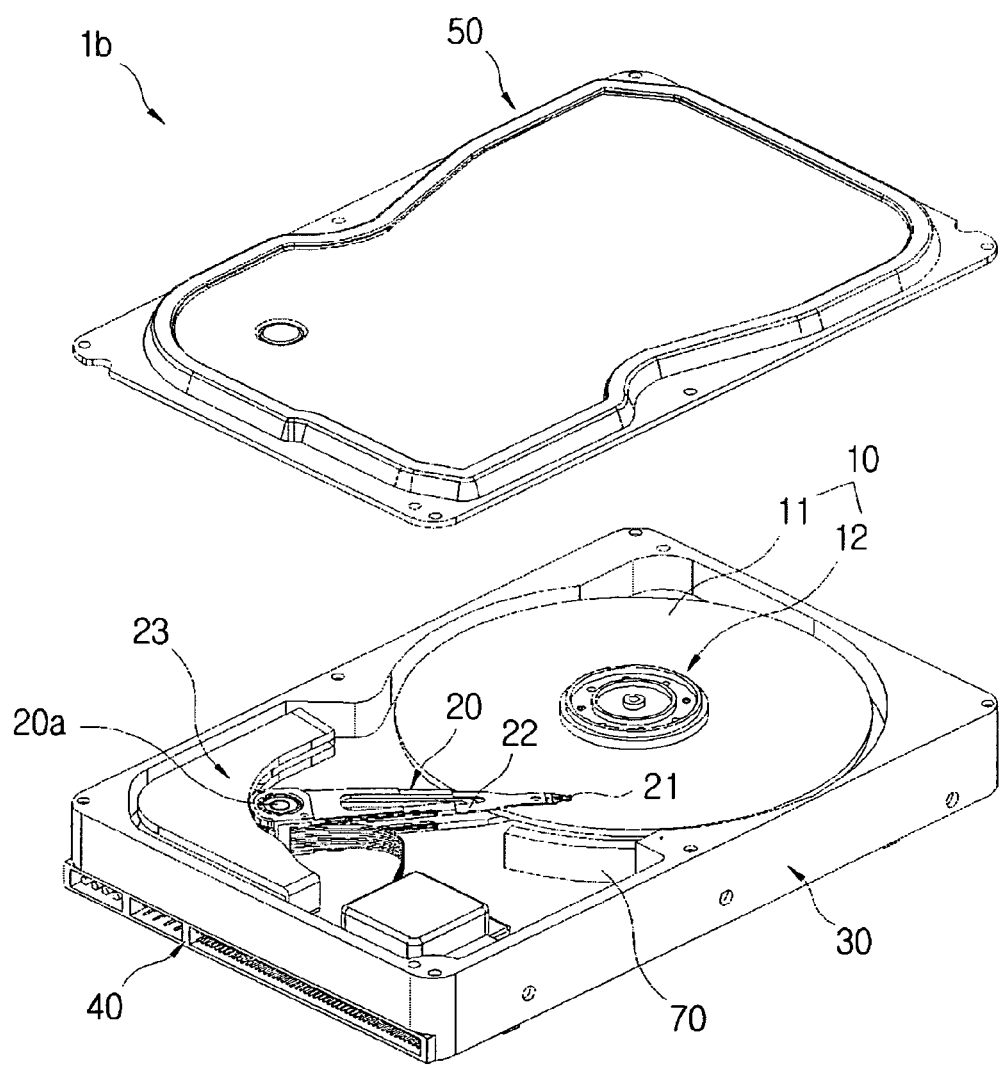
FIG. 5 is a perspective view of an HDD apparatus according to another exemplary embodiment of the present inventive concept.
Figure 6:
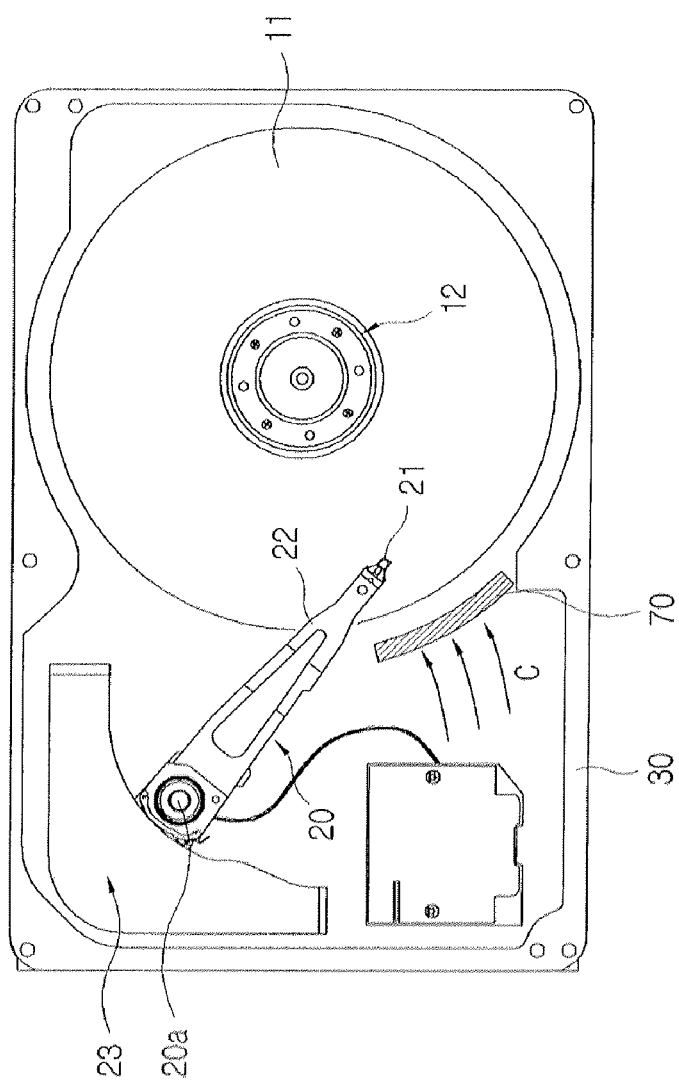
FIG. 6 is a top plan view of the HDD apparatus of FIG. 5 without the cover.

FIG. 5 is a perspective view of an HDD 1b according to another exemplary embodiment of the present general inventive concept. FIG. 6 is a top plan view of the HDD 1b of FIG. 5 without the cover.

Referring to FIGS. 5 and 6, in the HDD 1b according to the present exemplary embodiment, the air dam 70 is solely provided without the air force dispersion unit 60. In the HDD 1b configured as above, the track non-uniformity generated when the interval between tracks is not maintained constant during the copying of a servo pattern or the recording of data due to the air force concentrating on the HSA 20 may be prevented or substantially reduced. Furthermore, an overall quality and yield of the HDD 1b may be improved.

FIG. 7 is a schematic view illustrating an electronic apparatus including an HDD 110 according to an exemplary embodiment of the present general inventive concept. In exemplary embodiments, the electronic apparatus 100 may include a camcorder, a camera, a computer, a printer, and various other devices which include a data storage unit. However, the present general inventive concept is not limited thereto.

As illustrated in FIG. 7, in an exemplary embodiment, the electronic apparatus 100 includes a hard disk drive 110 having a base 30 to support at least one data storage disk 10, a head unit 20 used to read and or write data to the data storage disk 10, and an air dispersion unit 60 configured within the HDD 110 to disrupt, divert, or disperse an airforce generated during an operation of the HDD 110. However, the present general inventive concept is not limited thereto. That is, in exemplary embodiments, the HDD 110 may include at least one of the air dispersion unit 60 and an air dam 70 (not illustrated).

The HDD 110 may include a head unit (not illustrated) which may be used to read and/or write data from or onto the data storage unit 10. The HDD 110 may further include a terminal which extends therefrom to connect to an external apparatus or device. The electronic apparatus 100 may further include a controller unit 120, a data processing unit 130, and an interface 140. The controller unit 120 may be electrically or wirelessly connected with the HDD 110 to control an operation of the HDD 110. The controller unit 1200 may be connected with the data processing unit 130 to process data received and/or transmitted to the HDD 110. The interface 140 may be electrically or wirelessly connected to the controller unit 120 and an external apparatus 150. The interface 140 may provide a user access to or control of an operation within the electronic apparatus 100 or within the external apparatus 150.

Figure 8A:
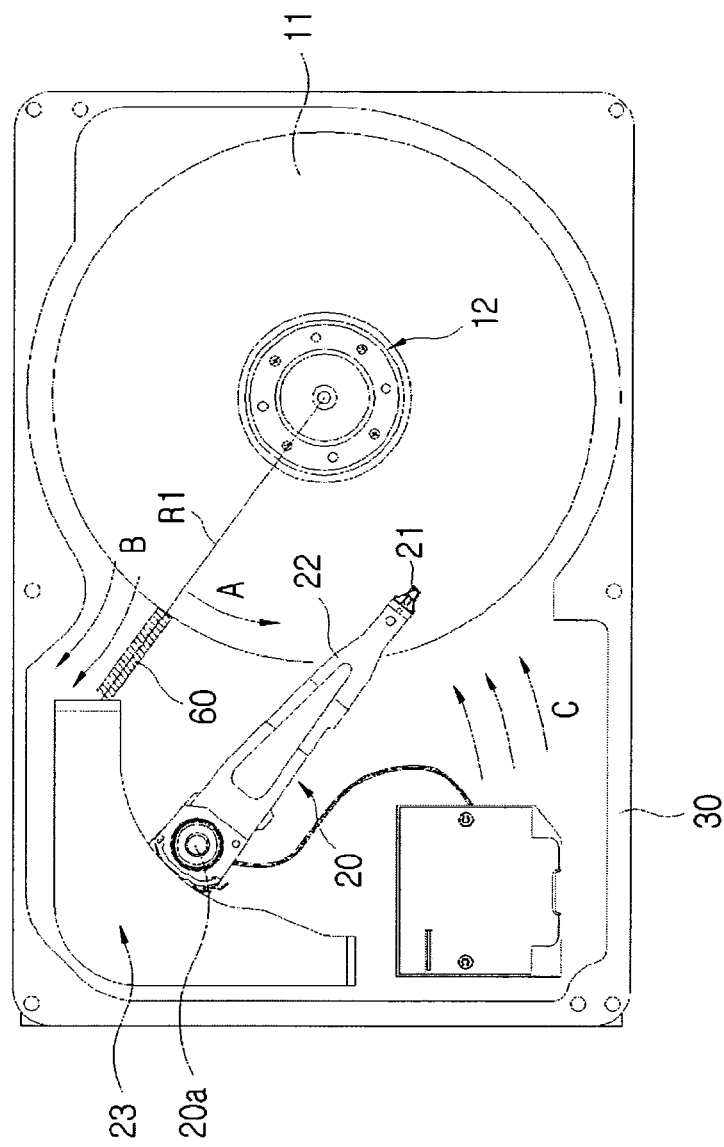
FIGS. 8A through 8G are top plan views illustrating further exemplary embodiments of the air dispersion unit and the air dam according to the present general inventive concept.
Figure 8B:
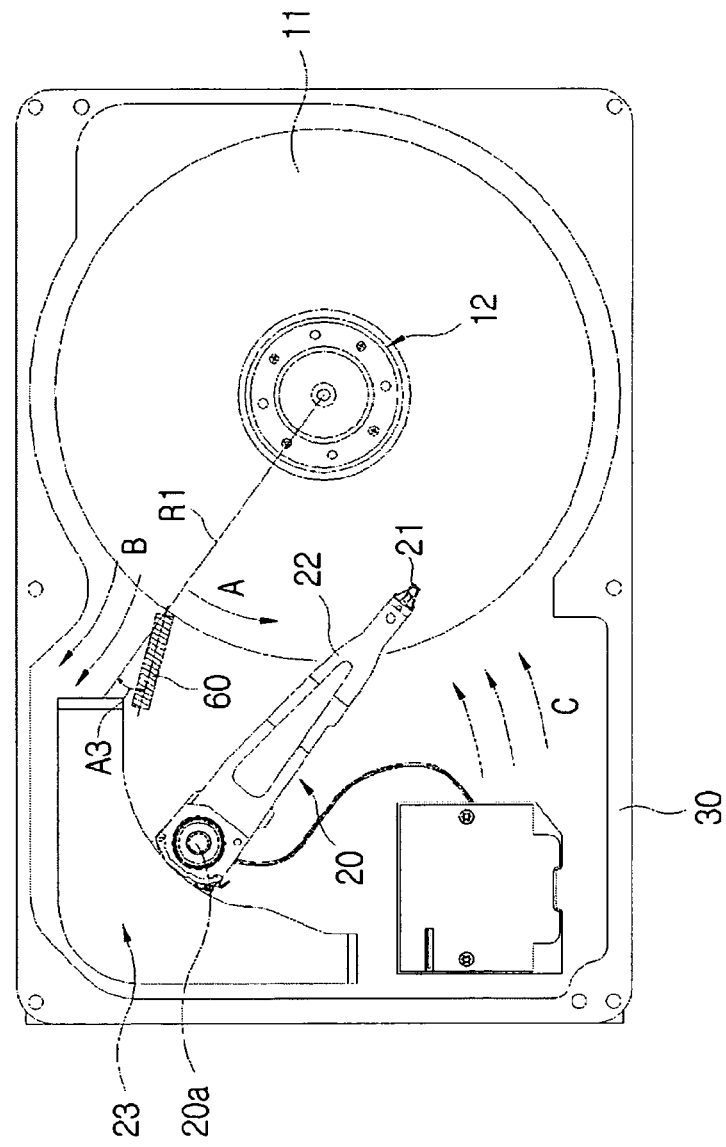
Figure 8C:
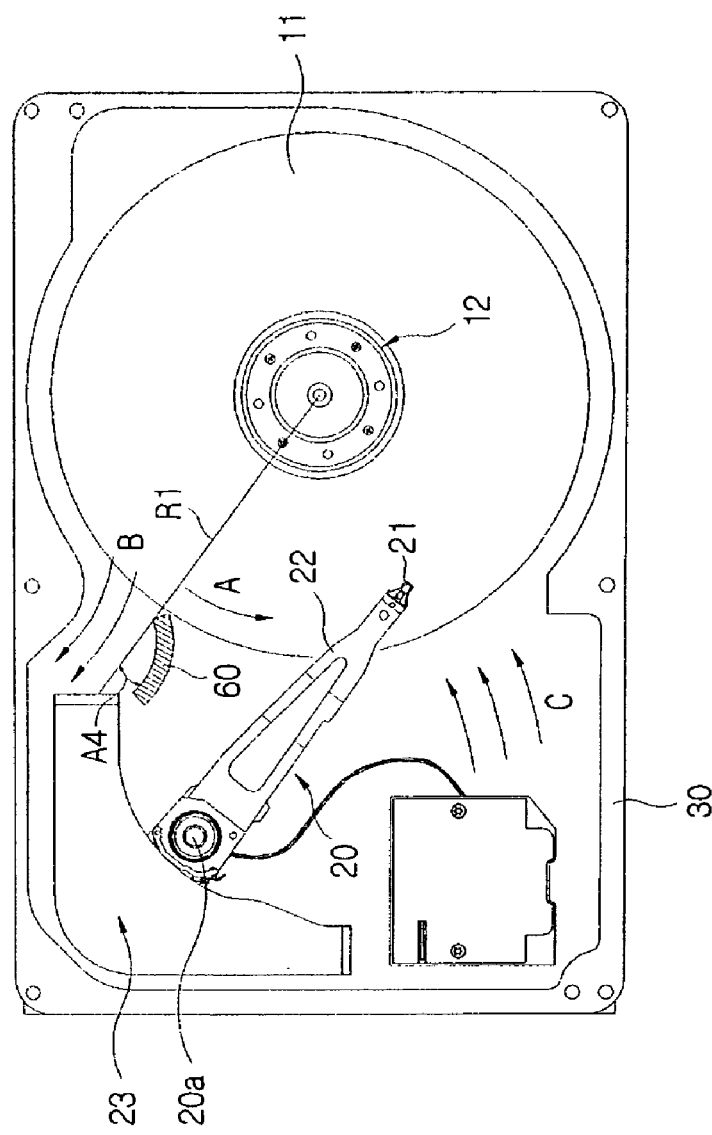

FIGS. 8A through 8C are top plan views illustrating exemplary embodiments of an air dispersion unit according to the present general inventive concept. FIGS. 8D through 8G are top plan views illustrating exemplary embodiments of an air dam according to the present general inventive concept.

Referring now to FIGS. 8A through 8C, in exemplary embodiments, a central longitudinal axis of the air dispersion unit 60 may be aligned with respect to a radial direction R1 of the disk 10. In alternative exemplary embodiments, as illustrated in FIG. 8B, the central longitudinal axis of the air dispersion unit 60 may be disposed at an angle A3 with respect to the radial direction R1. However, the present general inventive concept is not limited thereto. That is, in alternative exemplary embodiments, the air dispersion unit 60 may be curved and disposed at an angle A4 with respect to the radial direction R1 (see FIG. 8C).

Figure 8D:
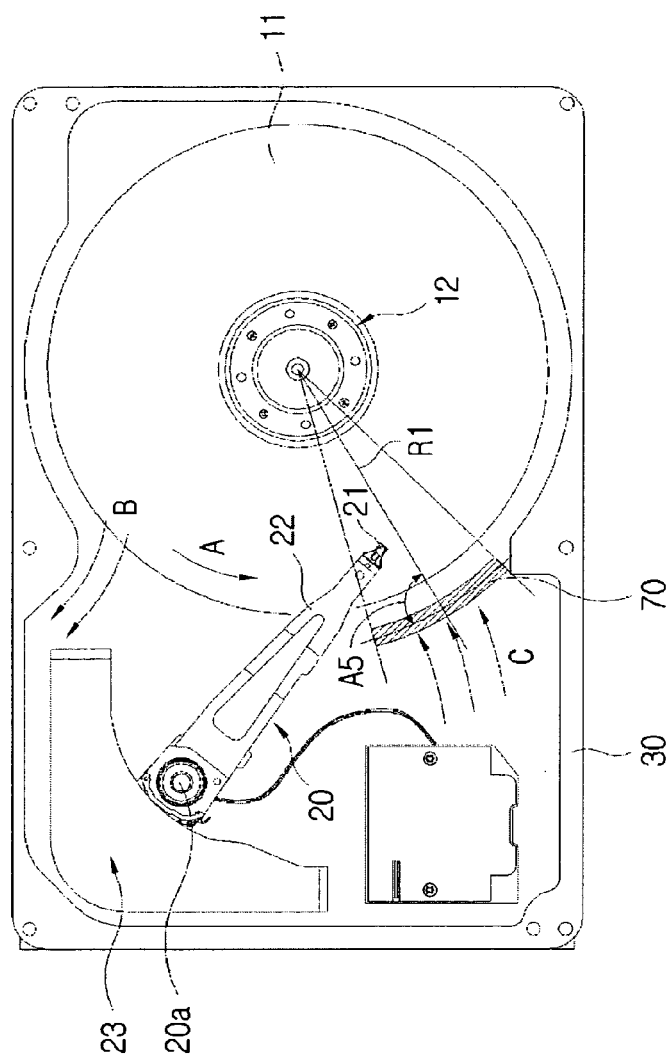
Figure 8E:
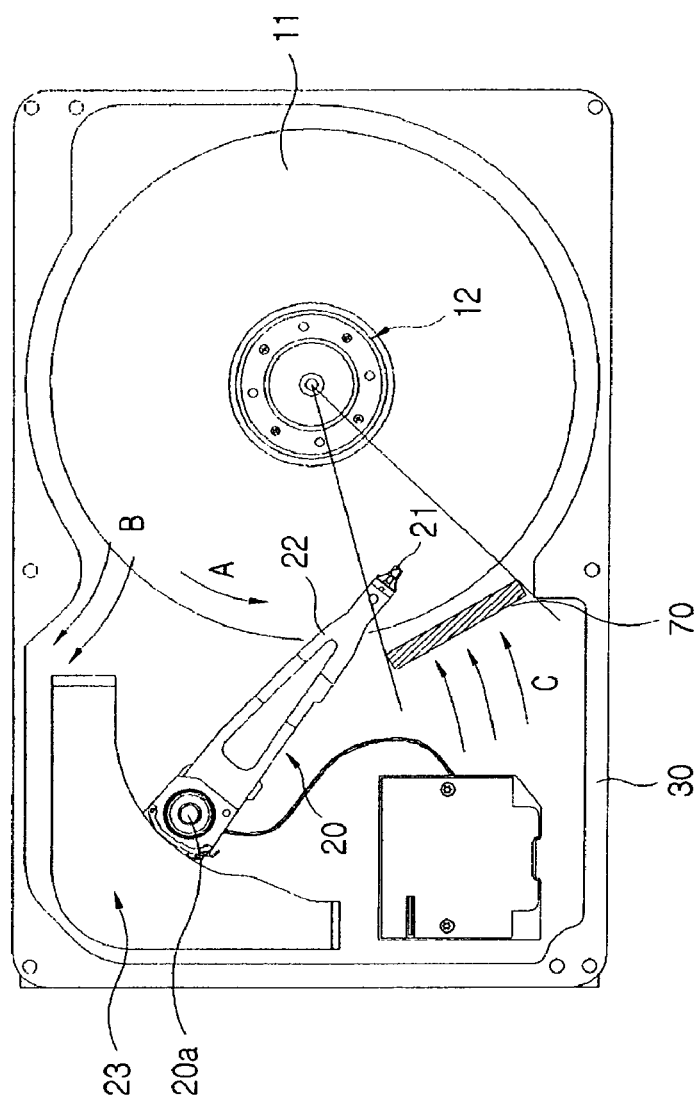
Figure 8F:
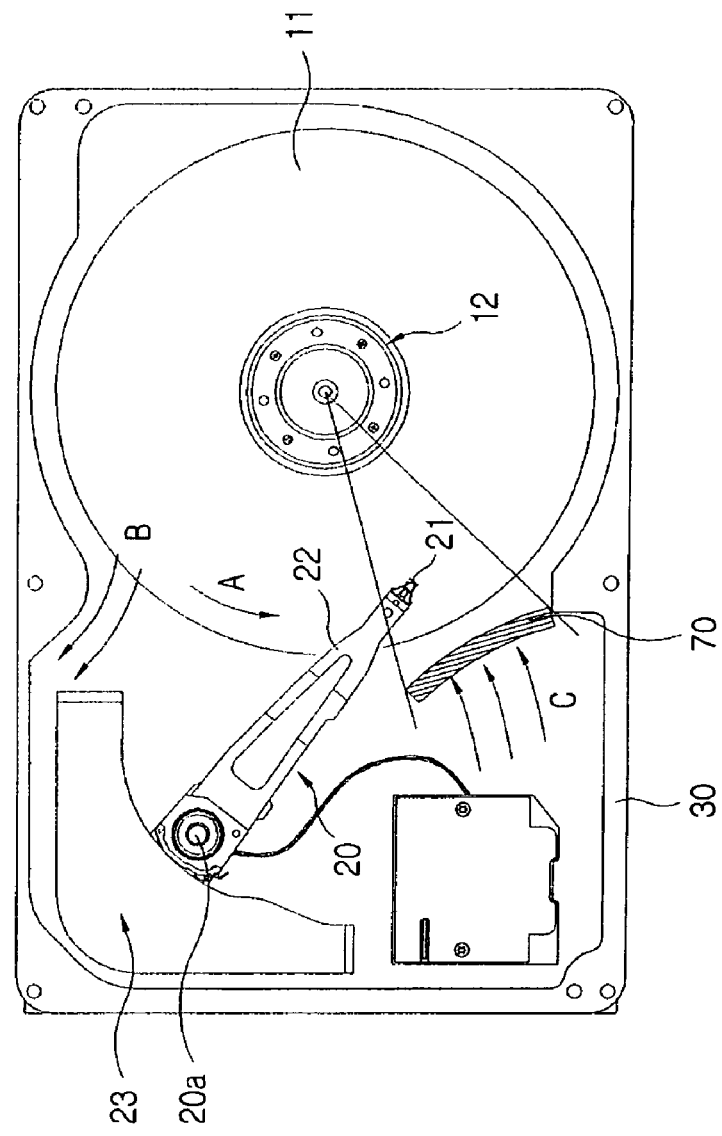

Referring now to FIGS. 8D through 8F, in exemplary embodiments, the air dam 70 may not be concentric with the disk 11. That is, the air dam 70 may be disposed at an angle A5 with respect to the radial direction R1 of the disk 11. In alternative exemplary embodiments, the air dam 70 may be substantially straight and may be disposed adjacent to an area in which the magnetic head 21 may move to deflect an air flow from contacting the HSA 20. (See FIG. 8E). However, the present general inventive concept is not limited thereto. That is, in exemplary embodiments, the air dam 70 may be disposed convexly with respect to the disk 11. (See FIG. 8F).

Figure 8G:
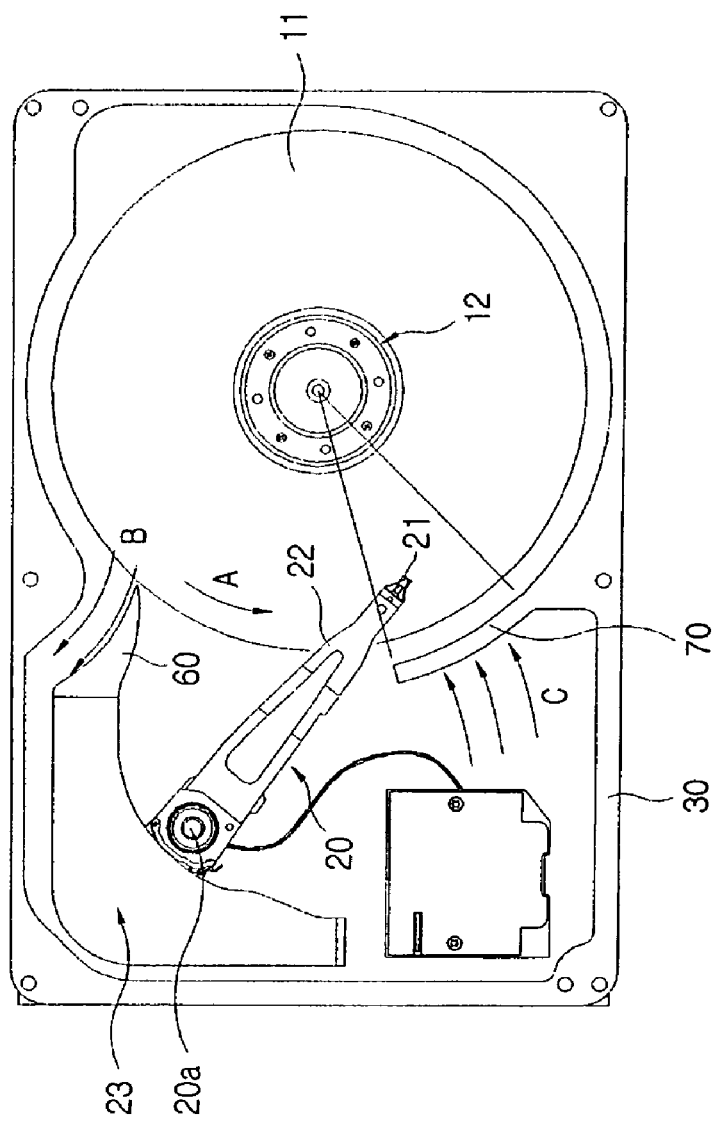

In further alternative exemplary embodiments, as illustrated in FIG. 8G, the air dispersion unit 60 and/or the air dam 70 may be integrally formed with the VCM 23 or the base 30, respectively.

As described above, according to the present general inventive concept, the HDD may prevent or substantially reduce track non-uniformity generated when an interval between tracks is not maintained constant during copying of a servo pattern or recording of data due to an air force which is concentrated on the HSA, and further may improve an overall quality and yield of the HDD.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents

What is claimed is:

1. An apparatus comprising:
a disk disposed in a base and operable to rotate;
a head stack assembly operable to rotate about a pivot shaft and comprising an actuator; and
an air force dispersion unit disposed adjacent to the head stack assembly and operable to disperse an air force generated during the rotation of the disk, wherein the air force dispersion unit is operable to cause a first part of the air force to flow toward the actuator and a second part of the air force to flow to a rear of the head stack assembly.

2. The apparatus of claim 1, wherein the air force dispersion unit stands erect with respect to a lower surface of the base in an area between the disk and the head stack assembly.

3. The apparatus of claim 1, wherein the head stack assembly further comprises:
a voice coil motor disposed at an opposite position of the pivot shaft with respect to the actuator, wherein the voice coil motor is operable to drive the actuator, wherein the air force dispersion unit is arranged in a direction crossing a circumferential direction of the disk.

4. The apparatus of claim 1, wherein a first portion of the air force dispersion unit is provided at or adjacent to an outer circumferential surface of the disk while a second portion of the air force dispersion unit is coupled to the head stack assembly.

5. The apparatus of claim 1, further comprising:
a cover operable to cover an upper surface of the base, wherein the air force dispersion unit is disposed on the cover.

6. The apparatus of claim 1, further comprising:
an air dam provided at a position opposite to the air force dispersion unit and operable to block an air flow from the head stack assembly toward the disk.

7. The apparatus of claim 6, wherein the air dam stands erect with respect to a lower surface of the base outside the disk.

8. The apparatus of claim 6, wherein the air dam has an arc shape.

9. The apparatus of claim 6, wherein the air dam is integrally formed on the base.

10. The apparatus of claim 6, wherein the air dam is disposed on a cover that covers an upper surface of the base.

11. An apparatus comprising:
a disk disposed in a base;
a head stack assembly operable to rotate around a pivot shaft, comprising:
an actuator having an end portion supporting a magnetic head, and
a voice coil motor disposed at an opposite position of the pivot shaft with respect to the actuator and operable to drive the actuator; and
an arc-shaped air dam corresponding to a circumferential surface of the disk disposed outside of the disk and operable to block an air flow from a rear of the head stack assembly toward the disk.

12. The apparatus of claim 11, wherein the air dam is integrally formed on the base and stands erect with respect to a lower surface of the base outside the disk.

13. A disk drive, comprising:
a data storage unit disposed within a base and having an outer circumferential surface;
a head unit disposed completely outside of the outer circumferential surface of the data storage unit;
an actuator coupled with the head unit and extending across the outer circumferential surface; and
an air flow disrupter disposed completely outside of the outer circumferential surface of the data storage unit and configured to disrupt an airflow path within the base, wherein the air flow disrupter is operable to cause a first part of the airflow to flow toward the actuator and a second part of the airflow to flow to a rear of the head unit.

14. A disk drive, comprising:
a data storage unit disposed within a base;
a head unit comprising a magnetic head; and
an air dispersion unit integrally formed on the base and configured to disrupt an airflow generated by the data storage unit to reduce an airflow toward the head unit, wherein the air dispersion unit is operable to cause a first part of the airflow to flow toward the magnetic head and a second part of the airflow to flow to a rear of the head unit.

15. The disk drive of claim 14, wherein the air dispersion unit is disposed between the data storage unit and the head unit.

16. The disk drive of claim 14, wherein the head unit is integrally formed with the air dispersion unit.

17. An electronic apparatus, comprising:
- a disk drive having a base to support at least one data storage disk;
- a head unit comprising a magnetic head used to read/write data from the at least one data storage disk;
- an air dispersion unit positioned within the base to disrupt an airflow of the data storage disk, wherein the air dispersion unit is operable to cause a first part of the airflow to flow toward the magnetic head and a second part of the airflow to flow to a rear of the head unit; and
- a controller.

18. The electronic apparatus of claim 17, wherein the air dispersion unit is disposed between the data storage unit and the head unit.

19. The electronic apparatus of claim 17, wherein at least one of the base and the head unit is integrally formed with the air dispersion unit.

20. A method of manufacturing an electronic apparatus, the method comprising:
- disposing at least one data storage disk on a base;
- disposing a head unit comprising a magnetic head on the base; and
- forming at least one air dispersion unit within the base operable to divert a path of an airflow generated by the at least one data storage disk, wherein the air dispersion unit is operable to cause a first part of the airflow to flow toward the magnetic head and a second part of the airflow to flow to a rear of the head unit.

21. The apparatus of claim 1, wherein the air force dispersion unit is integrally formed on the base.

* * * * *